United States Patent [19]
Herzl

[11] Patent Number: 4,565,098
[45] Date of Patent: Jan. 21, 1986

[54] HYBRID SENSING SYSTEM FOR VORTEX FLOWMETER

[75] Inventor: Peter J. Herzl, Morrisville, Pa.
[73] Assignee: Fischer & Porter Company, Warminster, Pa.
[21] Appl. No.: 648,933
[22] Filed: Sep. 10, 1984
[51] Int. Cl.$^4$ .............................................. G01F 1/32
[52] U.S. Cl. .................................... 73/861.22; 73/197
[58] Field of Search ..................... 73/195, 197, 861.22, 73/861.24, 861.18, 861.34

[56] References Cited
U.S. PATENT DOCUMENTS

| | | | |
|---|---|---|---|
| 4,142,407 | 3/1979 | Kuroiwa et al. | 73/861.22 X |
| 4,320,650 | 3/1982 | Kita | 73/861.22 X |
| 4,386,520 | 6/1983 | Nagaishi | 73/861.22 X |

Primary Examiner—Herbert Goldstein
Attorney, Agent, or Firm—Michael Ebert

[57] ABSTRACT

A hybrid sensing system for a vortex-type flowmeter in which fluidic oscillations are generated at a frequency depending on the flow rate of the fluid being metered, the flowmeter being operative throughout a wide range of frequencies. The system includes both a thermal sensor whose signal, which is applied to a first pre-amplifier, has an amplitude that is relatively high in the low-frequency portion of the meter range, and a force sensor whose signal, which is applied to a second pre-amplifier, has an amplitude that is relatively high in the high-frequency portions of the range. The signal amplitudes of the pre-amplifiers are compared to effect control of a selector switch which acts to couple the pre-amplifier yielding a greater output at the prevailing frequency to a trigger generating pulses at a rate determined by this frequency and indicative of flow rate. The operation of the switch may also be made subject to the prevailing frequency so that a switch-over from the first to the second pre-amplifier will not take place even if justified by the amplitude difference therebetween, unless the then prevailing frequency exceeds a predetermined value.

9 Claims, 6 Drawing Figures

HYBRID SENSING SYSTEM FOR VORTEX FLOWMETER

BACKGROUND OF INVENTION

1. Field of Invention

This invention relates generally to vortex type flowmeters for measuring the rate of flow of a fluid passing therethrough, and more particularly to a hybrid sensing system for a meter of this type which renders the meter operative throughout a very wide range of flow rate values.

2. Prior Art

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being the so-called Swirlmeter type, and another, the bluff-body type. The present invention is not limited to these specific types and is applicable to all forms of hydrodynamic oscillatory metering devices in which fluidic variations are sensed to provide an indication.

In Swirlmeters, such as those described in U.S. Pat. Nos. 3,279,251, 3,314,289 and Re. No. 26,410, among others, a fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube is a Venturi section to create a vortex.

Precession takes place about the central axis of the flow tube at a discrete frequency that is a function of the volumetric flow rate. Cyclic variations in local fluid velocity occurring by reason of precession are sensed to provide electrical pulses whose frequency is measured to provide an indication of flow rate.

In bluff-body type vortex meters as disclosed, for example, in my prior U.S. Pat. Nos. 4,123,940; 4,181,020; 4,226,117; 4,262,544; 4,433,957 and 4,270,391, whose disclosures are incorporated herein by reference, a shedder body is mounted in the flow tube which acts to divide the incoming fluid into two streams and to cause vortices to be alternately shed on either side of the body.

In making flow rate measurements, very large variations in flow rate are encountered in certain commercial and industrial applications. One such application involves flow rate measurement of natural gas. In a typical installation, the natural gas to be metered is used to supply a gas-fueled furnace as well as gasfired stoves and other appliances.

In wintertime, the furnace, whose operation is regulated and therefore undergoes an on-off cycle, usually represents the main load in the gas supply line and draws more than 60 percent of the gas being metered. The remaining base load might vary from 2 to 10 percent at various times. In order to measure this widely varying flow properly, a flowmeter would be required with a better than 50 to 1 operating range.

Vortex meters, whether of the Swirlmeter or bluff-body type, are potentially fully capable of operating within a very wide range of flow rate values, but what prevents them from doing so are the existing limitations of their sensors to detect fluidic pulses or oscillations.

As will be evident from the patents identified above which disclose Swirlmeters as well as bluff-body types of vortex meters, a number of different types of sensors have heretofore been provided to detect the passage of fluidic vortices or the presence of fluidic oscillations in the flow tube. In the case of Swirlmeters, the most commonly used sensors are of the thermal type, while in the case of bluff-body vortex meters, use is often made of force type sensors.

Thermal sensors are constituted by an element whose resistance varies as a function of temperature. In practice, the thermal sensor may be a self-heating element, such as a platinum or nickel wire or film, a silicon element, or a thermistor. Or it may take the form of an indirectly-heated device such as a thermocouple.

The thermal sensor is exposed to the fluidic oscillations in the meter, and as the velocity of the fluid passing the body of the electrically-heated sensor increases, this action serves to withdraw heat from the sensor. But when the fluid velocity decreases, less heat is removed and the sensor heats up. These thermal changes are reflected in corresponding changes in resistance which are converted in an associated circuit into a signal indicative of the frequency of the oscillations and hence of the prevailing flow rate.

Since heat transfer is a relatively slow process, thermal sensors are incapable of changing temperature instantaneously and require a finite time to effect this change. In general, the larger the mass of the sensor, the slower is its thermal response and the smaller the change in body temperature in a given time period.

At high fluidic velocities (i.e., high frequencies—for many vortices then pass by), one must use a thermal sensor of very small mass in order to realize measurable temperature fluctuations to produce an output signal that is proportional to the fluidic frequency. The difficulty with thermal sensors having a tiny mass is that they tend to be fragile and are therefore not well suited to industrial applications. On the other hand, thermal sensors of larger mass, though inherently more rugged, are effectively responsive only to the low velocity range.

A force sensor which may take the form of a wire strain gauge, a piezoelectric pressure-responsive assembly or a pressure-responsive electromagnetic transducer, exploits the pressure and velocity phenomenon associated with fluidic vortices to detect their passage past the sensor. The forces generated by the vortices vary as a function of density multiplied by the square of the velocity. Consequently, at low velocities, these forces are very small, and a force sensor adapted to detect these small forces tends to be too fragile to reliably sustain the forces generated by dense fluids at high velocity. On the other hand, it is relatively easy to design a rugged force sensor to detect high-velocity, high-density fluids.

Thus a rugged thermal sensor having a relatively large mass suitable for commercial and industrial applications, responds best to fluidic oscillations or vortices in the low-frequency operating range, while a rugged force sensor suitable for the same application responds best to fluidic oscillations in the high-frequency operating range. Neither sensor, by itself, is capable of responding to fluidic oscillations in a wide operating range that encompasses both the low-frequency and high-frequency ranges.

SUMMARY OF INVENTION

In view of the foregoing, the main object of this invention is to provide a sensing system for a vortex meter of the Swirlmeter or bluff-body type which renders the meter effective to measure flow rate in a wide operating range that encompasses both the low and high frequencies. In the context of vortex-type meters, low frequencies are those from 1 to about 50 Hz, while high frequencies are those from about 50 to 1000 Hz.

More particularly, an object of this invention is to provide a hybrid sensing system for a vortex meter which uses both rugged thermal and force sensors capable of withstanding rigorous operating conditions to yield a useful output indicative of flow rate throughout a wide range of flow rate values.

A significant advantage of the invention is that is makes it possible to use the vortex meter in commercial and industrial applications in which wide variations in flow rate are encountered.

Also an object of the invention is to provide a hybrid sensing system which discriminates against some forms of noise input, such as noise arising from vibrations creating parasitic signals.

Briefly stated, these objects are accomplished in a hybrid sensing system for a vortex-type flowmeter in which fluidic oscillations are generated at a frequency depending on the flow rate of the fluid being metered, the flowmeter being operative throughout a wide range of frequencies. The system includes both a thermal sensor whose signal, which is applied to a first pre-amplifier, has an amplitude that is relatively high in the low-frequency portion of the meter range, and a force sensor whose signal, which is applied to a second pre-amplifier, has an amplitude that is relatively high in the high-frequency portions of the range. The signal amplitudes of the pre-amplifiers are compared to effect control of a selector switch which acts to couple the pre-amplifier yielding a greater output at the prevailing frequency to a trigger generating pulses at a rate determined by this frequency and indicative of flow rate. The operation of the switch may also be made subject to the prevailing frequency so that a switch-over from the first to the second pre-amplifier will not take place even if justified by the amplitude difference therebetween, unless the then prevailing frequency exceeds a predetermined value.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Sensor Characteristics

Figure 1:
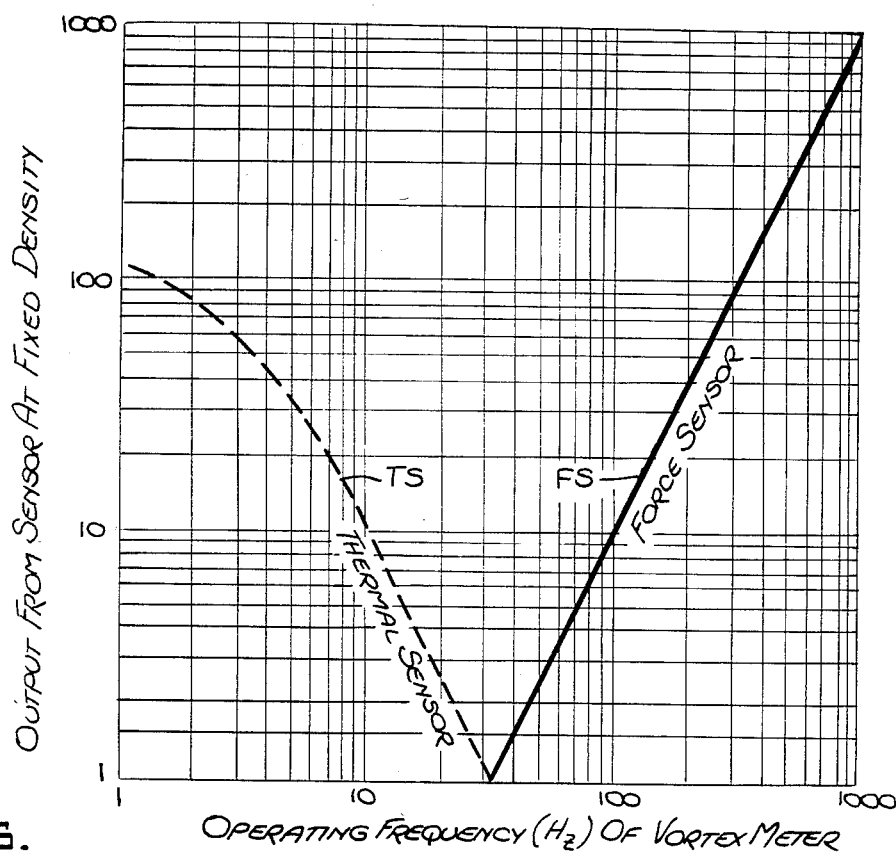
FIG. 1 is a graph on a logrithmic scale showing the output curve of a thermal sensor and that of a force sensor in which the amplitude of the sensor output is plotted against the operating frequency of the vortex meter in which these sensors function to detect the fluidic oscillations generated therein.

Referring now to FIG. 1, curve TS shows the amplitude of the signal yielded by a standard thermal sensor at a fixed fluid density plotted against the operative frequency (1 to 1000 Hz) of a vortex meter in which this sensor detects fluidic oscillations generated therein. The output curve TS shown for the thermal sensor might be typical for a sensor with a time constant of about 7 seconds or more in the fluid being measured.

It will be seen that the amplitude is very high at a frequency of 1 Hz and falls rapidly to a point where at an operating frequency well below 100 Hz, the amplitude is at a very low level. Hence this thermal sensor is effective only within the low-frequency portion of the operating range. (The real curve for the thermal sensor is somewhat more complex than the simplified curve illustrated.)

Curve FS represents the response of a standard force sensor with a fluid of the same fixed density. It will be seen that the output signal of the force sensor rises from a low point at the upper end of the low-frequency portion of the range and rises linearly as the operating frequency in the high frequency portion of the operating range goes to 1000 Hz. (The output shown for the force sensor is an accurate representation of the characteristics of a real sensor.)

The output of both the thermal and force sensor varies as a function of fluid density; and in the case of a thermal sensor, the output is also affected by the composition of the fluid, which determines its heat transfer characteristics. Thus neither the force nor the thermal sensor is capable of providing a useful output in a wide operating range, for the use of a typical thermal sensor is effectively limited to meters operating in a low frequency range, while the force sensor works best in a higher frequency range.

Vortex Meter with Hybrid Sensors

Figure 2:
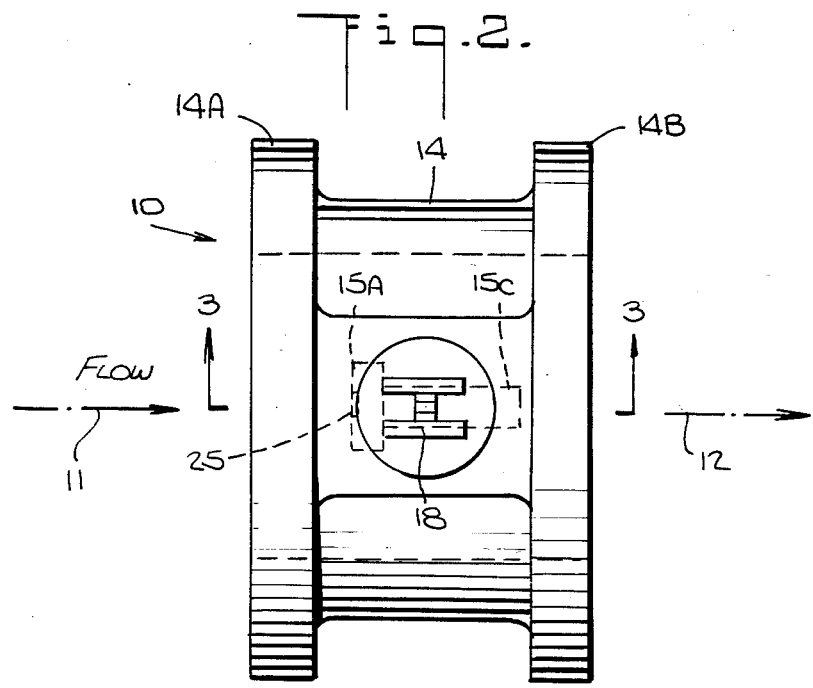
FIG. 2 is a plan view of a vortex-shedding flowmeter which incorporates hybrid sensors in accordance with the invention.
Figure 3:
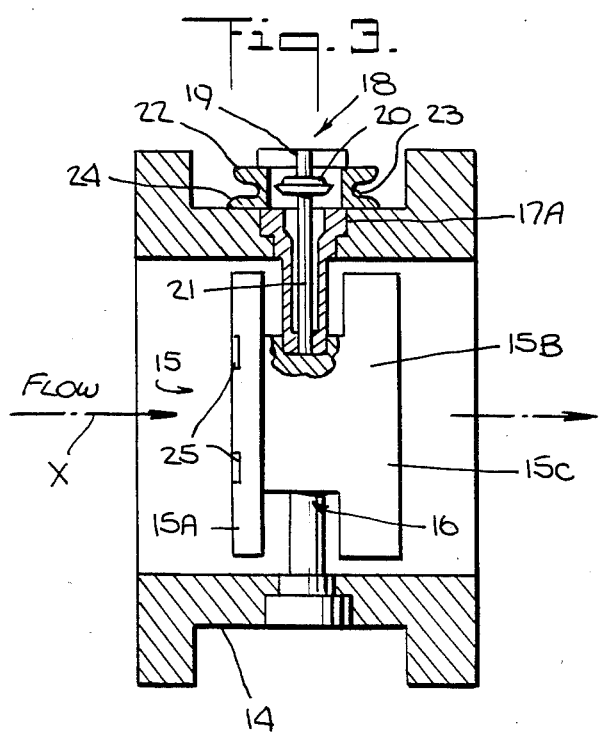
FIG. 3 is a section taken in the plane indicated by 3—3 in FIG. 2.
Figure 4:
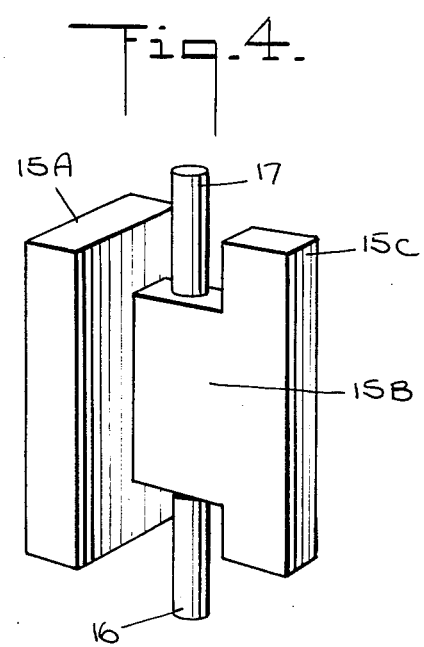
FIG. 4 is a separate perspective view of the shedder unit.

Referring now to FIGS. 2 to 4, there is shown one embodiment of a vortex meter of the bluff-body type which includes both a thermal sensor and a force sensor associated with an electronic signal recovery system in accordance with the invention wherein information as to flow rate within a wide operating range is extracted at any one time from that sensor which at the prevailing frequency is most effective in detecting the prevailing fluidic oscillations.

While the vortex meter shown, generally designated by numeral 10, is of the type disclosed in my prior U.S. Pat. No. 4,339,957 and uses a similar force sensor arrangement, it is to be understood that the invention is usable with any known vortex meter structure in which fluidic oscillations are generated whose frequency depends on flow rate.

Meter 10 is interposed between the upstream line 11 and the downstream pipes of a flow line. The meter is provided with a cylindrical flow pipe 14 having end flanges 14A and 14B. In practice, flow pipe 14, which serves as the body of the meter, is interposed in a process line carrying a liquid or gas whose flow is to be metered, the end flanges being bolted to the end flanges of the upstream and downstream pipes of the line.

Mounted transversely within flow pipe 14 is an integrated shedder/sensor unit, generally identified by reference numeral 15, having a leading section 15A in the form of a rectangular plate, whose broad front face looks toward the incoming fluid and whose rear face is joined at its center zone by an intermediate section beam 15B having a rectangular cross section to a rectangular bar tail section 15C whose width is the same as that of the beam and whose height is the same as that of the leading section.

The unit is torsionally mounted on a pivot axis which coincides with its center of gravity and is perpendicular to the longitudinal flow axis X of flow pipe 14. The incoming flow stream which impinges on unit 15 is divided thereby, producing fluidic perturbations in the form of a Karman vortex street. Unit 15 is pivotally supported by lower and upper torque tubes 16 and 17 which are attached to the intermediate section beam 15B, the torque tubes lying on the pivot axis.

Lower torque tube 16 has its stepped base section seated within and welded to a like-shaped bore in flow pipe 14, its tip being welded to the lower edge of intermediate section 15B. Upper torque tube 17, as best seen in FIG. 3, is arranged so that its stepped base section 17A is received within a similarly-configured bore extending through the wall of flow pipe 14, the end of this base section being welded to the pipe. The tip section of torque tube 17 is received within and welded to a socket formed in the upper edge of intermediate section 15B of the unit.

The unit is operatively coupled to an external torque transducer, generally designated by numeral 18, by a link assembly which serves to transmit the torsional motion of upper torque tube 17 to torque transducer 18. This transducer is preferably a balanced piezoelectric structure A. The transducer includes a pair of sub-assemblies each interposed between a stationary pre-loading block and a respective face of the rod extension 19 of the link assembly, each sub-assembly including a pair of piezoelectric elements in side-by-side relation. Rod extension 19 is coupled by a coupler 20 to a main rod 21 which extends into torque tube 17 and is anchored in the tip section of this tube and welded thereto.

Coupler 20 is formed by a pair of cup-shaped flexible diaphragms in face-to-face relation whose circular flanges are welded together to define a cell similar to that of an aneroid barometer. Torque transducer 18 is seated on the annular upper section 22 of an isolator which is joined by a cylindrical intermediate section 23 to an annular lower section 24, coupler 20 being disposed within the isolator. Lower section 24 is secured to flow pipe 14.

Transducer 18 detects the motion of unit 15 as it oscillates about its pivot axis to produce a signal whose frequency is proportional to the flow rate of the fluid being metered. The torsional suspension of the unit effected by torque tubes 16 and 17 limits pivot motion at maximum torque to a microscopic motion in the order of a half micron in either direction from the neutral position; hence the unit is virtually motionless in operation.

In this meter arrangement, the torsional force created by the torsionally-mounted unit 15 is applied to the outside of upper torque tube 17 which is welded to flow pipe 14. The resultant torsional motion of torque tube 17 is transmitted by main rod 21, coupler 20 and extension rod 17 of the link assembly to the external piezoelectric torque transducer 18 which functions as a force sensor.

Mounted on the front face of the leading section 15A of shedder unit 15 is a pair of thermal sensors 25 which may be connected to an external circuit, to be later described, by leads going through the lower torque tube 16.

The Hybrid Sensing Electronic System

Figure 5:
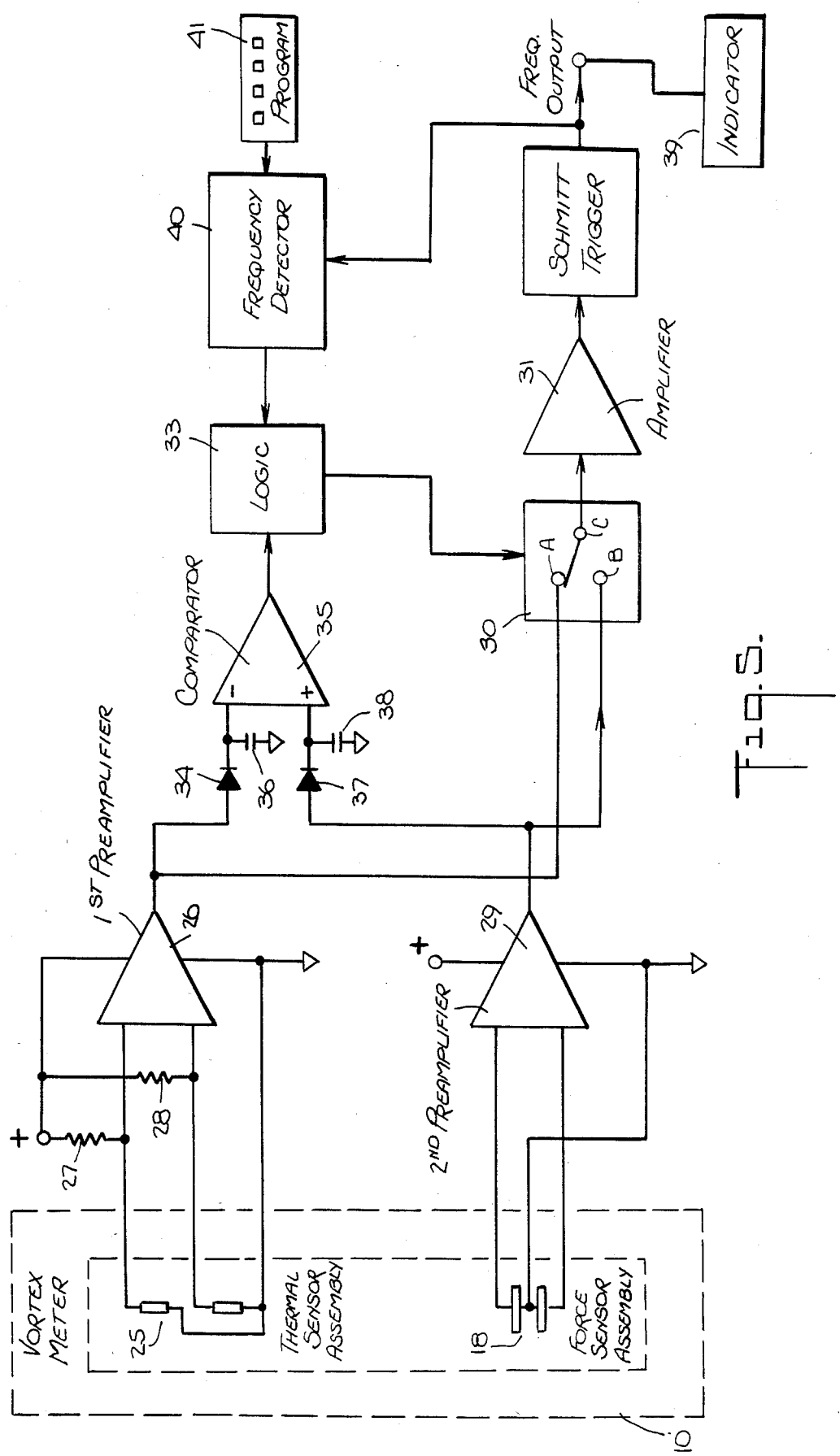
FIG. 5 is a block diagram of the hybrid sensing electronic system in accordance with the invention.

Referring now to FIG. 5, there is shown the electronic system associated with the pair of piezoelectric force sensors 18 and the pair of resistive element thermal sensors 25.

Thermal sensors 25 are connected to the respective inputs of a differential pre-amplifier 26 in such a way that the current passing through the sensors by way of fixed resistors 27 and 28 connected to a d-c source causes a temperature rise therein. The fluid flowing in meter 10 removes varying amounts of heat from the thermal sensors, causing resistance changes therein, the resultant voltage drop being applied to the inputs of the first pre-amplifier 26. These voltages are differentially amplified so that the output of pre-amplifier 26 has a frequency which corresponds to the prevailing repetition rate or frequency of the fluidic oscillations, and an amplitude which depends on the response of the thermal sensors to the prevailing frequency.

Force sensors 18 are connected differentially to the inputs of pre-amplifier 29 whose output has a frequency which corresponds to the prevailing fluidic frequency and an amplitude which depends on the frequency response of the force sensors.

In the system shown, the outputs of the first and second pre-amplifiers 26 and 29 are connected, respectively, to the fixed contacts A and B of a selector switch 30 having a movable contact C. Movable contact C is connected to the input of an operational amplifier 31 whose output is applied to a Schmitt trigger 32. While a mechanical switch is illustrated, in practice use is made of a solid state electronic switch whose operation is controlled by logic 33 in a manner to be described.

When either pre-amplifier has its output connected by switch 30 through amplifier 31 to Schmitt trigger 32, each oscillating cycle in the output is converted into a square wave pulse having a fixed duration and constant amplitude, but only if the oscillatory cycle has an amplitude which is distinguishable from any noise in the system, so as to elicit a proper response from the Schmitt trigger. If, therefore, thermal sensor pre-amplifier 26 is coupled by the switch to the Schmitt trigger, and the prevailing frequency is then in the high range, the pre-amplifier output will be extremely low and inadequate for operation of the trigger.

In order, therefore, to select for connection to the trigger the pre-amplifier providing the best information of the prevailing frequency in terms of a signal having a high amplitude, the output of pre-amplifier 26 is connected through a diode 34 to the reversing (−) input of an electronic comparator 35 having a capacitor 36 coupled to this input, while the output of pre-amplifier 29 is connected via diode 37 to the non-reversing input (+) of the comparator, a capacitor 38 being coupled thereto.

Thus the direct voltage established across capacitor 36 represents the average amplitude level of the output of preamplifier 26, and that established across capacitor 38 represents the average amplitude level of the output of pre-amplifier 29. The comparator advises logic 33 which pre-amplifier output has the greater amplitude at the prevailing operating frequency, and the logic on the basis of this advice, activates switch 30 to connect the pre-amplifier having the greatest output to amplifier 31.

Thus Schmitt trigger 32 produces square wave output pulses at a repetition rate which is in accordance with the frequency in the output of the selected preamplifier. These pulses are applied to a frequency indicator 39 calibrated to provide a flow rate reading.

At any given fluidic frequency, the output frequencies of the first and second pre-amplifiers are identical, whereas the amplitudes of these outputs, as shown in FIG. 1, depend on the respective frequency response characteristics of the thermal and force sensors. If, therefore, the prevailing operating frequency is, say, 20 Hz, the output of the first pre-amplifier will be fairly high while that of the second pre-amplifier will be very low; whereas if the prevailing frequency is, say, 500 Hz, the first pre-amplifier output will have a very low amplitude and that of the second will be very high.

Hence, at any given operating frequency, the best available information is obtainable from that pre-amplifier which for this frequency yields an output having a relatively high amplitude.

Figure 6:
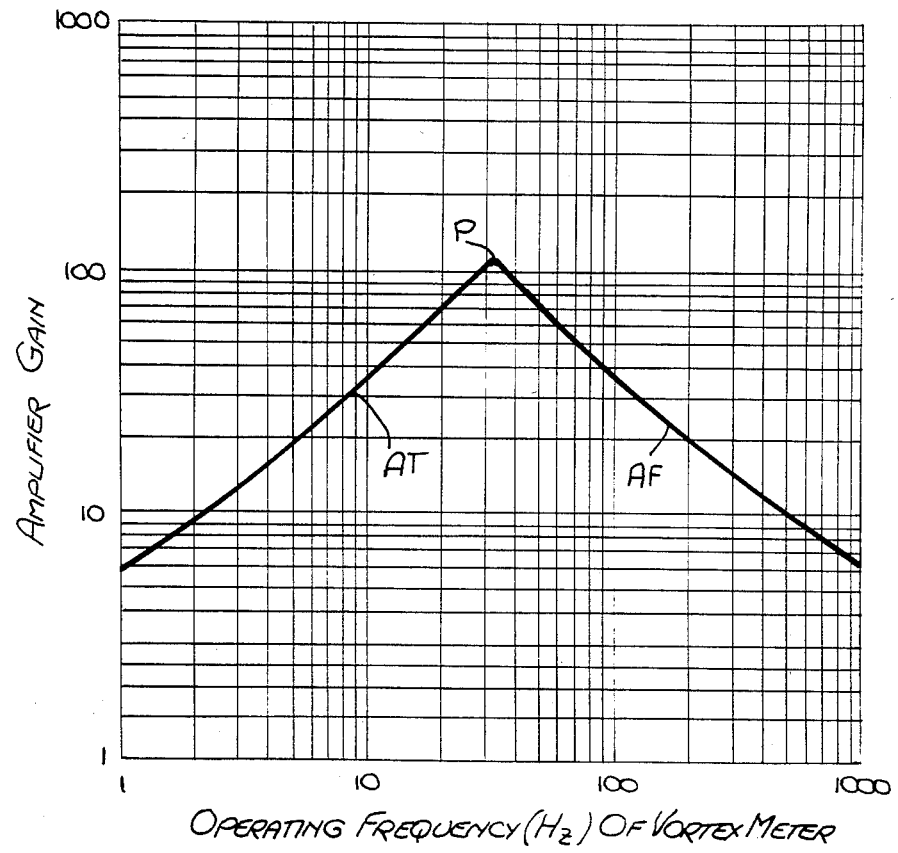
FIG. 6 is a graph on a logrithmic scale showing the response curve of the amplifier included in the system.

Amplifier 31, as shown in FIG. 6, has a frequency response curve over the operating range of the meter (1 to 1000 Hz), which is effectively the reverse of the combined response curves of the sensors, as illustrated in FIG. 1. Amplifier 31 acts therefore to partially normalize the signal amplitudes from both sensors to obtain a relatively constant signal amplitude over the wide operating range.

It will be seen that in order to effect normalization, when the response curve TS of the thermal sensor falls from a high level to a very low level in the low-frequency portion of the operating range, the corresponding response curve AT of amplifier 31 rises from a low level to a peak P. From this peak, the response curve AF of amplifier 31 in the high-frequency range falls to a lower level as the curve FS of the force sensor rises.

Force sensors are usually sensitive to mechanical noise, whereas thermal sensors are relatively immune to such noise. In some industrial installations, the vortex meter may be subject to vibration, and these usually lie within the low frequency range. If, for example, the vortex meter is in the vicinity of a heavy duty motor and is subject to vibrations originating at the motor of 20 Hz, these vibrations will cause the force sensor to yield a spurious high amplitude 20 Hz signal.

With a system in which switchover from one pre-amplifier to another occurs on the basis solely of an amplitude comparison, the 20 Hz high amplitude vibratory signal will cause an unwanted switchover at this frequency.

One can avoid a switchover at a low vibratory frequency, such as 20 Hz, by causing switchover to occur whenever the prevailing frequency exceeds a value representing the transition point for a particular arrangement between the low frequency operating range and the high frequency range of the meter, say, at 32 Hz. This can be done by connecting the output of Schmitt trigger 32 to a frequency detector 40 associated with an adjustable program switch 41 which causes the detector to provide an output indication when the prevailing frequency in the meter exceeds a preset value, such as 32 Hz. This output indication is applied to logic 33 to cause it to activate selector switch 32 on this occurrence. Program switch 41 can be set to a desired frequency value.

However, switching of the pre-amplifier outputs purely on the basis of detected frequency in order to avoid the effect of vibratory noise picked up by the force sensor is not desirable. The sensitivity of the thermal sensor varies with the heat removal capacity of the fluid, so that the ideal thermal-to-force sensor switching point depends on the nature of the fluid.

In order, therefore, to effect a switchover which takes the prevailing meter frequency into account as well as the relative signal amplitudes of the pre-amplifier outputs, logic 33 considers both the output of comparator 35 and that of frequency detector 40. In this way, a switchover only takes place from the thermal sensor pre-amplifier to the force sensor pre-amplifier when the output amplitude of the latter is significantly higher than the former and the prevailing frequency exceeds a predetermined value, say, 32 Hz or 50 Hz.

In this way, if the output amplitude of the force sensor pre-amplifier is higher than that of the thermal sensor pre-amplifier as a result of 20 Hz vibrations, no switchover will take place despite the higher amplitude until the prevailing meter frequency is 32 Hz or higher.

In practice, the thermal and force sensors may be in separate housings, as shown in the figures, or may be placed in the same housing. Many different shedder shapes may be used, and the invention is not limited to any particular shedder configuration or to particular sensor locations. Thus the thermal sensors may be placed in a probe downstream of the shedder unit rather than on the face of the shedder unit, as shown.

While there has been shown and described a preferred embodiment of a hybrid sensing system for vortex flowmeter in accordance with the invention, it will be appreciated that many changes and modifications may be made therein without, however, departing from the essential spirit thereof.

I claim:

1. In a vortex type meter for measuring the flow rate of a fluid passing through a flow tube by generating fluidic oscillations whose frequency depends on flow rate; a hybrid sensing system which renders the meter operative throughout a wide range encompassing a low and high frequency range, said system comprising:

A a thermal sensor exposed to the fluidic oscillations and having a frequency response characteristic which yields a relatively high amplitude signal only in the low frequency range;

B a force sensor exposed to the fluidic oscillations and having a frequency response characteristic which yields a relatively high amplitude signal only in the high frequency range;

C a trigger to generate output pulses at a frequency determined by that of the signal applied thereto; and D means to compare the relative amplitudes of said sensors and to select the signal from the sensor having the higher amplitude at the prevailing meter frequency for application to said trigger to provide output pulses whose frequency is indicative of the flow rate.

2. The combination as set forth in claim 1, wherein said sensor signals are applied to respective pre-amplifiers.

3. The combination as set forth in claim 2, wherein said means includes a comparator coupled to said pre-amplifiers to provide an output indicative of which signal has the higher amplitude.

4. The combination as set forth in claim 3, wherein the output of the comparator is applied to a logic which controls a selector switch to couple the pre-amplifier yielding an output signal of higher amplitude to the trigger.

5. The combination as set forth in claim 4, further including an amplifier interposed between the selector switch and the trigger.

6. The combination as set forth in claim 5, wherein said amplifier has a frequency response characteristic which serves to normalize the signal amplitudes yielded by the pre-amplifiers.

7. The combination as set forth in claim 6, further including means to detect the frequency of the pulses yielded by the trigger to provide an indication when this frequency exceeds a predetermined value, which frequency indication is applied to the logic which so controls the switch that a switchover does not occur unless the frequency indication is detected.

8. The combination as set forth in claim 1, wherein said thermal sensor is constituted by at least one thermistor.

9. The combination as set forth in claim 1, wherein said force sensor is constituted by at least one piezoelectric element.

* * * * *